Figure 1:
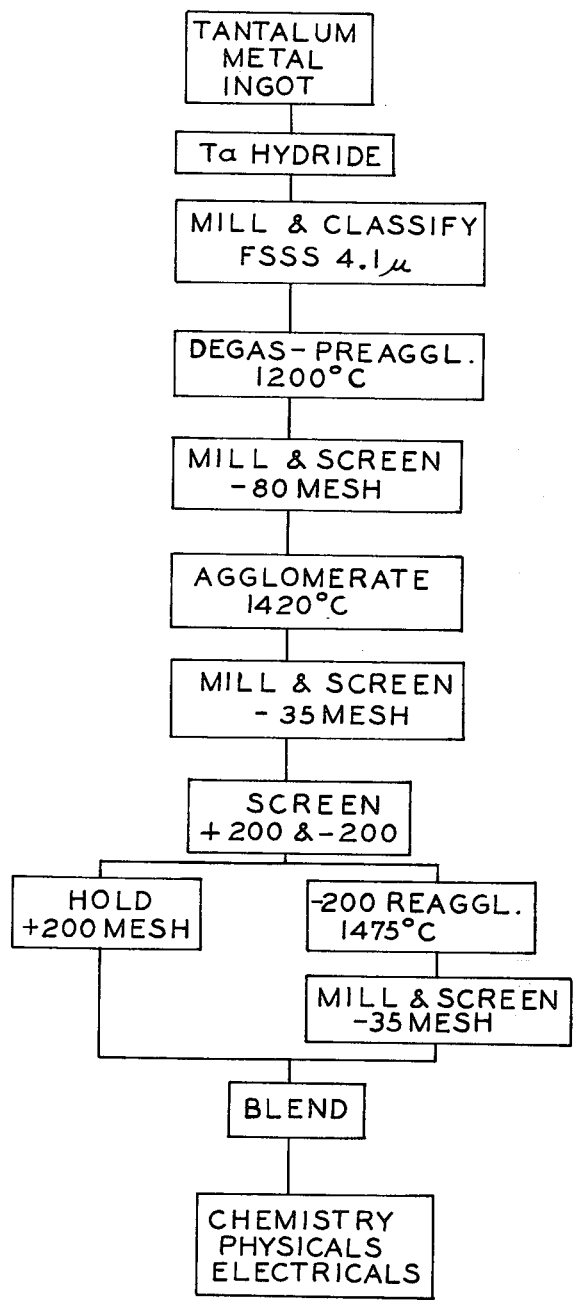

United States Patent [19]

Hakko

[11] 4,141,719
[45] Feb. 27, 1979

[54] TANTALUM METAL POWDER

[75] Inventor: James B. Hakko, Waukegan, Ill.

[73] Assignee: Fansteel Inc., North Chicago, Ill.

[21] Appl. No.: 801,558

[22] Filed: May 31, 1977

[51] Int. Cl.$^2$ .............................................. B22F 1/04
[52] U.S. Cl. .................. 75/0.5 BB; 75/251; 148/126
[58] Field of Search .......................... 75/0.5 BB, 251; 148/126

[56] References Cited

U.S. PATENT DOCUMENTS

| | | | |
|---|---|---|---|
| 3,418,106 | 12/1968 | Pierret | 75/0.5 BB |
| 3,473,915 | 10/1969 | Pierret | 75/0.5 BB |
| 3,635,693 | 1/1972 | Friedrich et al. | 75/0.5 BB |
| 4,009,007 | 2/1977 | Fry | 75/0.5 BB |
| 4,017,302 | 4/1977 | Bates et al. | 75/0.5 BB |

*Primary Examiner*—W. Stallard
*Attorney, Agent, or Firm*—Barnes, Kisselle, Raisch & Choate

[57] ABSTRACT

Improved, high-purity agglomerated tantalum powders having an exceptional combination of a relatively low oxygen content, high green strength when pressed into compacts without using any binders, and, when compacted and sintered as anodes for capacitors have reduced shrinkage of the pressed compacts during sintering, and have high electrical capacitance and breakdown voltage along with low direct current leakage and low dissipation factor. Such powder is produced by milling hydrided high-purity tantalum metal ingots to a powder of specified particle size and size distribution, subjecting the powder to a heat treatment at a temperature T-1 to degas and preagglomerate it, milling and screening the degassed and preagglomerated powder to preferably about −200 mesh size, subjecting the −200 mesh powder to a higher temperature T-2 to reagglomerate it, milling and screening the reagglomerated powder to about −35 mesh, and blending the final powder. The final powder is compacted without a binder and sintered to produce anodes of electrolytic capacitors.

31 Claims, 2 Drawing Figures

TANTALUM METAL POWDER

BACKGROUND OF THE INVENTION

This invention relates to improved tantalum powder useful in powder metallurgy and particularly in making electrodes for electrolytic capacitors by powder metallurgy techniques and to electrodes porduced from such powder.

Electrodes and particularly anodes for solid and liquid type electrolytic capacitors have been previously produced from various tantalum powders by various powder metallurgy techniques. In anodes for such capacitors, it is desirable to have as high a specific capacitance (CV/g) as possible along with low DC leakage, low dissipation factor, and high breakdown voltage characteristics.

A previously known capacitor anode and a process and tantalum powder for producing such an anode is disclosed and claimed in Pierret U.S. Pat. Nos. 3,934,179; 3,473,915; and 3,418,106 respectively. As disclosed in these Pierret patents, a capacitor anode may be made by crushing a hydrided tantalum ingot into particles having a size in the range of about 2 to 30 microns, agglomerating the crushed particles, crushing the resulting agglomerated mass to a powder until about 75% by weight will pass through a 325 mesh screen, mixing the resulting powder with a binder, pressing the resulting mixture into a compact, sintering the resulting compact, and anodizing the sintered compact in a phosophric acid solution to form an anodic dielectric film on the sintered compact to thereby produce a capacitor anode.

Binders often of a carbonaceous type such as carbowax, acrawax, and glyptol are usually mixed with the tantalum powder to improve its flow characteristics so that it may be readily dispensed in automatic pellet making or compact forming machines to rapidly produce pellets of uniform weight. Usually binders are also needed to form a compact with adequate green strength to withstand handling and loading prior to sintering. However, use of carbonaceous binders is objectionable because it requires a two step sintering process which involves a first heat treatment to remove the binders followed by a second heat treatment at a higher temperature to sinter the compact. Use of carbonaceous binders also results in the sintered compact retaining residual carbon which tends to adversely affect its electrical properties which are desirable for capacitor anodes.

In producing compacts of powdered tantalum with high speed automatic presses, a portion of the powder is not pelletized or compacted due to intentional overfilling of the dies, and any resulting pellets which are defective are recrushed into powder. Such overfill and recrushed powder is recycled, may ultimately be pressed or compacted several times, and during such recycling tends to be degraded in quality and characteristics desirable for producing capacitor anodes.

An improved tantalum powder and process of making it suitable for producing capacitor anodes by powder metallurgy techniques without utilizing any binders and which is not degraded by recycling is disclosed in Bates et al U.S. Pat. No. 4,017,302. This improved tantalum powder is produced by hydriding high purity tantalum metal ingots, milling the hydrided tantalum metal to a powder of predetermined particle size, subjecting the powder to a two step heat treatment to degas and preagglomerate it, milling and screening the preagglomerated powder to a powder of an intermediate mesh size, subjecting the powder of intermediate mesh size to a high temperature treatment to agglomerate it, milling the agglomerated powder to a powder of finer intermediate mesh size, screening the powder of finer intermediate mesh size to remove a portion of the finer particles thereof, subjecting the removed finer particles to an additional heat treatment to reagglomerate them, milling and screening the removed and reagglomerated particles to finer particles, and blending the removed and milled finer particles with the portions of the coarser particles of the agglomerated powder.

Fry U.S. Pat. No. 4,009,007 discloses that the electrical capacitance of anodes produced from tantalum powder can be increased by the addition to the powder of about 5 to 400 parts per million by weight of elemental phosphorus and that in some instances such addition of phosphorus also improves the flow properties of the powder.

SUMMARY OF THE INVENTION

This invention produces an improved tantalum powder particularly useful in making capacitor anodes by a process of hydriding a tantalum metal ingot, reducing and classifying the resulting hydride tantalum to a powder having a predetermined particle size, degassing and preagglomerating the reduced tantalum powder, reducing the pragglomerated powder to a screen size of less than 80 mesh, reagglomerating the reduced powder, reducing the reagglomerated powder to an average intermediate particle size which is larger than the reduced preagglomerated powder, and blending the reduced powder of intermediate particle size.

The resulting improved tantalum powder has all of the desirable characteristics of the powder produced by the process of U.S. Pat. No. 4,017,302 and also has improved green strength and a lower oxygen content which is desirable when making capacitor electrodes to minimize embrittlement of tantalum lead wires embedded in the compact before sintering. During sintering the embedded wires may become embrittled by absorption of sufficient oxygen from the tantalum powder. Capacitor anodes made from this improved powder also have less shrinkage, improved reliability, longer useful life, and in some instances less direct current leakage and somewhat higher capacitance than anodes produced by the powder of U.S. Pat. No. 4,017,302.

Objects, features and advantages of this invention are to provide an improved process for making tantalum powders which is simpler and less expensive to utilize than previously known processes, produces a powder having good flow characteristics, can be recycled in compacting operations, and requires no binders to produce a compact; when compacted has high green strength and can be sintered with little shrinkage and minimum embrittlement of any tantalum lead wires embedded therein; and when the compact is sintered has low density and can be anodized to provide capacitor anodes having low direct current leakage, low dissipation factor, high capacitance, high working and breakdown voltages, improved reliability, and a longer useful life in service.

These and other objects, features and advantages of this invention will be apparent from the following detailed description, appended claims, and accompanying drawing in which:

FIG. 1 is a block diagram of the prior art process disclosed in U.S. Pat. No. 4,017,302 for making tantalum powder useful in producing capacitor anodes by powder metallurgy techniques; and FIG. 2 is a block diagram of the process of this invention for producing improved tantalum powder useful in making capacitor anodes.

Referring in more detail to the drawings, FIG. 1 illustrates the principal steps in the previously known process of producing tantalum powders useful in making capacitor anodes which are previously briefly described herein, and fully set forth in U.S. Pat. No. 4,017,302, which is incorporated herein by reference and hence this prior process will not be described in further detail.

Figure 2:
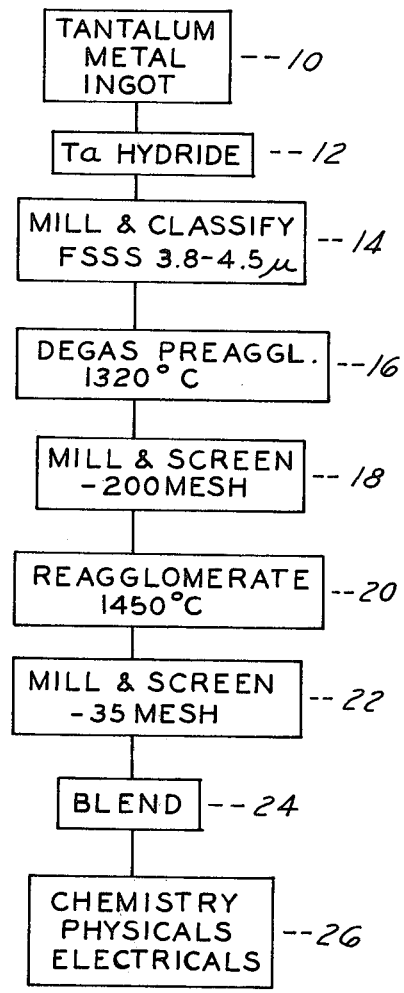

Referring to FIG. 2, tantalum metal ingots 10 used in the process of this invention may be produced by several methods, depending on the intended use and properties required of the final powder. When the final powder is intended for use as electrodes in capacitors, the tantalum metal must be high purity, with all impurities at adequately low levels to achieve the desired electrical properties. Tantalum metal consolidated into ingots by electron-beam melting, or by consumable-electrode, arc melting are preferred sources for such high-purity tantalum metal. Another preferred source is high-purity tantalum powder produced by sodium reduction of potassium tantalum fluoride, $K_2TaF_7$, typically at temperatures above the melting point of all ingredients except tantalum, which precipitates as a fine powder. To permit reduction of tantalum metal to a fine powder, it is embrittled by subjecting the tantalum metal to a hydriding treatment to convert it to tantalumn hydride by heating it in a hydrogen atmosphere by procedures well known in the art. This hydriding treatment result in absorption of about 0.4 weight percent hydrogen in the tantalum, which converts it to the embrittled form called tantalum hydride 12 of FIG. 2.

Tantalum hydride 12 is reduced by milling it to the desired average particle size in the preferred range of about 3-6 microns, which is commonly measured as Fisher sub-sieve size (FSSS) in accordance with ASTM B330-65, "Standard Method of Test for Average Particle Size of Refractory Metals and Compounds by the Fisher Sub-Sieve Size."The attainment of the desired average Fisher sub-sieve size and a generally Gaussian particle size distribution is essential to producing capacitor electrodes having a high capacitance and minimum oxygen content. Powders which are too fine result in electrodes with excessive oxygen content and powders which are either too coarse or too fine result in electrodes with lower capacitance. This requires that the milled hydride be classified as indicated at 14, with any oversize material recycled for further milling. In preferred embodiments of this invention, a milled and classified powder with an average FSSS in the range of about 3.8 to 4.5 microns is believed to be optimal.

The classified hydride powder 14 is degassed to remove the hydrogen, and preagglomerated as indicated at 16 by heating under non-reactive conditions, i.e., vacuum or high-purity argon or helium. The tantalum hydride powder is first heated to about 800° C. to remove hydrogen, and then it is further heated to about 1100°-1400° C., and preferably to about 1320° C., for about one-half four to one hour at temperature to preagglomerate the powder. This treatment results in a loosely agglomerated, porous mass in which it is believed the finer particles tend to become strongly bonded to each other, but with only weak bonding occurring between the coarser particles.

Following this treatment, the material is milled and screened as indicated at 18 to pass typically through at least an 80 mesh and preferably about a 200 mesh (U.S. Standard) screen, with any oversize material subjected to sufficient further milling so that it passes through the screen. Preferably as much material as possible, and at least about 45% by weight, should be initially milled to a fine enough size to pass through the screen without remilling.

The milled and screened powder 18 is subjected to a reagglomeration treatment 20 by heating it under chemically non-reactive conditions, i.e., in vacuum or high-purity gasses such as argon or helium, to a temperature of typically 1375°-1525° C., and preferably about 1450° C. to 1460° C. for one-half to two hours and preferably about one hour at temperature.

The re-agglomerated cake is milled and screened as indicated at 22 to obtain the desired maximum mesh size, typically about −35 mesh, and particle size distribution of the final powder. Any oversize material is remilled and rescreened. Milling should only be the minimum amount necessary to obtain the desired mesh size because excessive milling creates fines that are detrimental to the final powder. The fines particularly reduce green strength, increase shrinkage during sintering, and cause loss in capacitance of anodes produced from the powders, particularly for higher temperature sintering conditions, such as 30 minutes at 2000° C.

The −35 mesh powder is blended as indicated at 24 to assure uniform distribution of the different size particles throughout the lot of powder, and then sampled and tested for chemical composition and physical properties. The blended powder is formed into sintered compacts having a density of 8-10 g/cm$^3$ by powder metallurgy techniques, anodized to produce anodes, and tested for electrical characteristics as indicated at 26.

This invention is further described in connection with the following examples which are for purposes only of elucidation and illustration and are not to be construed as limiting this invention as defined by the claims. While the following examples utilize tantalum powder, it will be appreciated that the desirable combination of characteristics achieved by this invention will also be obtained when powders of other metals are used. In addition to tantalum, this invention can utilize other hydride forming metals of Group VB of the Periodic Table of the Elements, including columbium (niobium) and vanadium, and also of the Group IVB hydride forming metals including titanium, zirconium and hafnium.

EXAMPLE 1

(a) Tantalum hydride powder was prepared by crushing an electron-beam melted tantalum ingot that had been saturated with hydrogen gas at an elevated temperature. The hydride was milled and classified to a Fisher sub-sieve size of 4.15 microns.

The particle size distribution of this precursor powder as measured by Roller analysis ["Metal Powder Size Distribution with the Roller Air Analyzer," by P. S. Roller, ASTM Special Publication No. 140 (1952)] which is referenced by ASTM for performance of ASTM B293-60 (70) [Subsieve Analysis of Granular Metal Powders by Air Classification] and also recgonized as the appropriate standard by the Metal Powder Association "12-51T (1951)", was found to be:

| Size Micron (μ) | % by Weight |
|---|---|
| 0–3 | 6.2 |
| 3–5 | 12.6 |
| 5–10 | 35.7 |
| 10–15 | 25.9 |
| 15–20 | 19.6 |
| 20–25 | 0.1 |

The apparent density, hereafter called "Scott density," of this powder was determined by the procedure of ASTM designation B 212–48, (Reapproved 1970) "Apparent Density of Metal Powders," and found to be 78.8 g/in$^3$.

(b) The tantalum hydride powder was heated under a high-purity, flowing argon atmosphere to 800° C. and held for 2 hours at temperature to remove the hydrogen. Then the furnace was evacuated to about $10^{-3}$ torr, and the degassed tantalum hydride powder was further heated to 1320° C. and held for one-half hour at temperature to preagglomerate the powder. Then this degassed and preagglomerated powder was cooled under vacuum for 2 hours, and then under helium during cooling to ambient temperature.

(c) The degassed and preagglomerated powder was milled and screened using a 200 mesh U.S. Standard Screen. The oversize material was further milled so that all powder was −200 mesh. The −200 mesh material was comprised of 55.6% by weight of −325 mesh powder by a screen test, had a Fisher subsieve size (FSSS) of 6.7 microns, and a Scott density of 72.0 g/in$^3$.

(d) The −200 mesh powder was heated in vacuum (about $10^{-3}$ torr) to 1450° C. and held for 1 hour at temperature, then cooled under vacuum for 2 hours and finally under helium to ambient temperature to produce reagglomerated powder.

(e) The reagglomerated powder was milled and screened using a 35 mesh U.S. Standard Screen, with any oversize material remilled and rescreened until all powder was −35 mesh.

(f) The −35 mesh powder was blended, sampled, and tested. The Fisher subsieve size was 9.0 microns, Scott density was 62.1 g/in$^3$, and a screen test showed 54.6% by weight of −325 mesh material. The final tantalum powder was found to have a Hall flow time of 32 seconds when measured in accordance with "Standard Method of Tests for Flow Rate of Metal Powders," ASTM B218-48 (Reapproved 1965), except that the test unit was modified to vibrate the Hall flow cup at a frequency of 3600 cycles per minute and an amplitude of 0.024 inch. Chemical analysis of the final powder showed an oxygen content of 1479 ppm (0.1479 weight percent), and a nitrogen content of 19 ppm (0.0019 weight percent).

The powder was pressed into individually weighed 2.010 ± 0.020 gram compacts in a 0.261 diameter die to a green density of 7.0 ± 0.05 g/cm$^3$ for determination of green strength. The compacts were each individually laid sideways under the anvil of a Chatillon Model LTCM Universal Tensile, Compression and Spring Tester provided with a flat anvil and base, and were crushed at a compression rate setting of 2.0. The pressure in pounds required to crush the compact was recorded as the green strength. Four compacts were tested for green strength, and the data were averaged. In this test, if any compact had a value that is an outlier as determined in accordance with ASTM E178-61T, an additional anode was pressed and tested. (An outlying observation, or outlier, was one that appeared to deviate markedly from other members of the set in which it occurred.) The green strength of the compacts of the final powder averaged 19.5 pounds.

For electrical tests, the powder was pressed into individually weighed 2-gram anodes with an embedded tantalum lead wire in a 0.261 inch diameter die to a green density of 7.2 ± 0.05 g/cm$^3$. The anodes were sintered either for 30 minutes at 1800° C. (optical) or for 30 minutes at 2000° C. (optical) in a cold-wall, vacuum sintering furnace ($10^{-5}$ torr absolute pressure), and then were tested for shrinkage in diameter during sintering and sintered density. The sintered compacts were anodized to produce a dielectric surface film and tested for electrical properties including direct current leakage, specific capacitance (CV/g), dissipation factor, and breakdown voltage (determined only on anodes sintered at 2000° C.).

The electrical testing procedure involved anodizing the sintered anodes in 0.01% phosphoric acid in water at 90 ± 2° C. Anodizing was carried out at a current density of 35 milliamps per gram until 200 volts was reached. The anodes sintered at 1800° C. were held at 200 volts for 2 hours. The anodes sintered at 2000° C. were anodized using a current density of 35 milliamps per gram to 200 volts, and 12 milliamps per gram from 200 to 270 volts, and were held at 270 volts for 1 hour.

The anodes, after anodizing, rinsing and drying, were first tested for direct current leakage (DCL). A phosphoric acid solution was employed. The test conditions were as follows:

| Anode Formation Voltage | Test Electrolyte Concentration | Test Voltage |
|---|---|---|
| 200 | 10.0% $H_3PO_4$ | 140 |
| 270 | 0.01% $H_3PO_4$ | 240 |

The anodes were immersed in the test solution to the top of the anode and the proper voltage was applied for 2 minutes, after which time the DCL was measured.

After DCL measurements were completed, the anodes formed to 200 volts were placed in a tray containing 10% phosphoric acid and permitted to soak 30 to 45 minutes, and the anodes formed to 270 volts were washed for three to five minutes in running distilled water, dried 45 minutes at 105 ± 5° C. in air, and then soaked in 10% phosphoric acid for 30 to 45 minutes. Thereafter, the capacitance was measured on the anodes immersed in 10% phosphoric acid by a type 1611B General Radio Capacitance Test Bridge with an a.c. signal of 0.5 volts and a d.c. bias of 3 volts. The dissipation factor also was determined from this bridge test.

Six similar anodes prepared from the same powder and sintered for 30 minutes at 2000° C., but not anodized, were measured for breakdown voltage (BDV). The BDV test was carried out by electroforming the anodes in an agitated 0.1% $H_3PO_4$ solution at 90 ± 2° C., with the forming voltage increased at the rate of 3 to 4 volts/minute until dielectric breakdown occurred. The point of breakdown was established when the forming current of the anode increased by 100 milliamperes (ma) over the current flowing at 100 volts, or when scintillation occurred. A mean breakdown voltage was determined after elimination of outliers. (An outlying observation, or outlier, was considered one that appeared to deviate markedly from other members of the set from which it occurred.) Only one outlier per test lot was considered acceptable. The procedure of ASTM E178-61T, "Tentative Recommended Practice for Dealing with Outlying Observations," was followed.

The test results on the anodes of this example were:

|  | Anodes sintered for 30 min. at: | |
|---|---|---|
|  | 1800° C | 2000° C |
| Shrinkage in diameter, % | 3.9 | 7.8 |
| Sintered density, g/cm$^3$ | 8.07 | 9.01 |
| Direct current leakage, $\mu$a/$\mu$fv × 10$^3$ | 24.3 | 56.6 |
| Capacitance, $\mu$ fv/g | 3917 | 3061 |
| Dissipation factor, % | 18.2 | 14.4 |
| Breakdown voltage, volts | — | 239 |

The data of this example demonstrates that the process of this invention produces an improved tantalum powder with a low Scott density, excellent flow properties, high green strength, and low oxygen content; when sintered, it exhibits low shrinkage and low density; and produces anodes having high capacitance and low dissipation factor when sintered up to 30 minutes at 2000° C. The direct current leakage and breakdown voltage are similar to those for anodes made of other high-purity, state-of-the-art tantalum powders.

EXAMPLE 2

(a) Tantalum from the same tantalum ingot and hydrided lot as in Example 1 was processed by the same procedure used in Example 1, except that Steps 18 and 20 were omitted. Thus, the final powder received the same degassing and preagglomeration, and final milling and screening, but did not receive the intermediate milling to a fine particle size and reagglomeration treatments.

(b) The powder thus processed was tested using the same procedure as described in Example 1.

The test results were:

| Physical Properties |  |
|---|---|
| Fisher sub-sieve size, microns | 6.7 |
| Scott density, g/in$^3$ | 72.0 |
| Green strength, lb. | 4.9 |
| Screen test, % −325 mesh | 55.6 |
| Hall flow, sec. | 49 |

| Chemical Analysis |  |
|---|---|
| Oxygen, ppm | 1317 |
| Nitrogen, ppm | 19 |

| Anode Properties |  |  |
|---|---|---|
|  | Anodes sintered for 30 min. at: | |
|  | 1800° C | 2000° C |
| Shrinkage in Dia., % | 6.2 | 10.5 |
| Sintered density, g/cm$^3$ | 8.68 | 9.83 |
| Direct current leakage, $\mu$a/$\mu$fv × 10$^3$ | 19.4 | 61.9 |
| Capacitance, $\mu$fv/g | 4158 | 2960 |
| Dissipation factor, % | 22.8 | 20.2 |
| Breakdown voltage, volts | — | 250 |

This example shows that omission of Steps 18 and 20 of reducing the preagglomerated powder and reagglomerating the reduced powder results in severe loss in green strength, reduced flow characteristics, increased shrinkage during sintering, higher sintered density, lower capacitance on anodes sintered for 30 minutes at 2000° C., and higher dissipation factors.

EXAMPLE 3

Tantalum powder from the same ingot and hydrided lot as in Example 1 was processed by the same procedure as used in Example 1 through Steps 12, 14 and 16 as indicated in FIG. 2 and described in detail under Example 1. To demonstrate the effect of the mesh size to which the powder is milled and screened in Step 18 of the process of this invention, the degassed and preagglomerated powder from Step 16 was divided into three portions 3A, 3B and 3C. In accordance with Step 18, portion 3A was milled to pass through an 80 mesh U.S. Standard screen, portion 3B was milled to pass through a 200 mesh U.S. Standard screen (as in Example 1), and portion 3C was milled to pass through a 325 mesh U.S. Standard screen. Then, in accordance with Steps 20–26, each portion was separately reagglomerated at 1450° C., milled and screened to −35 mesh, blended, and tested by the procedures described in Example 1.

The test results were:

| | | Powder Physical Properties | | | | |
|---|---|---|---|---|---|---|
| Ex. No. | Milled Size Step 18 | FSSS, $\mu$ | Scott Density g/in$^3$ | % −325 Mesh | Hall Flow Sec. | Green Strength lb. |
| 3A | −80 Mesh | 8.0 | 54.8 | 53.3 | 40 | 22.4 |
| 3B | −200 Mesh | 8.5 | 53.0 | 50.7 | 39 | 25.0 |
| 3C | −325 Mesh | 8.3 | 53.6 | 50.4 | 39 | 27.6 |

| | Powder Chemical Properties | |
|---|---|---|
| Ex. No. | Oxygen Content ppm | Nitrogen Content ppm |
| 3A | 1518 | 15 |
| 3B | 1508 | 14 |
| 3C | 1499 | 17 |

| | Anode Sintered Properties | | | |
|---|---|---|---|---|
|  | Diameter Shrinkage, % Sintered 30 min. at | | Sintered Density, g/cm$^3$ Sintered 30 min. at | |
| Example No. | 1800° C | 2000° C | 1800° C | 2000° C |
| 3A | 4.65 | 8.14 | 8.22 | 9.09 |
| 3B | 4.07 | 7.17 | 8.08 | 8.83 |
| 3C | 3.88 | 6.98 | 8.07 | 8.80 |

| | Anode Electrical Properties | | | | | | |
|---|---|---|---|---|---|---|---|
|  | Capacitance $\mu$ fv/g Sintered 30 min. at | | Direct Current Leakage,$\mu$a/ $\mu$fv × 10$^3$ Sintered 30 min. at | | Dissipation Factor, % Sintered 30 min. at | | Breakdown Voltage, volts Sintered 30 min. at |
| Example No. | 1800° C | 2000° C | 1800° C | 2000° C | 1800° C | 2000° C | 2000° C |
| 3A | 4038 | 3114 | 18.4 | 60.3 | 19.4 | 13.8 | 230 |
| 3B | 3978 | 3135 | 18.6 | 55.7 | 18.0 | 13.0 | 249 |
| 3C | 3967 | 3134 | 16.5 | 63.8 | 18.4 | 12.6 | 255 |

This data shows improvements similar to those described under Example 1 and that as the milled mesh size in Step 18 is made finer, the green strength and breakdown voltage increases somewhat and the shrinkage, sintered density and dissipation factor decreases somewhat.

EXAMPLE 4

To demonstrate the effect of adding phosphorus to the tantalum powder on the capacitance of anodes made therefrom, a lot of tantalum hydride powder was prepared in accordance with Steps 10-14 as described in Example 1 with an initial FSSS of 4.25 microns and divided into four portions 4A, 4B, 4C and 4D. Portions 4B and 4D were doped with a phosphorus additive by adding 25 ppm of elemental phosphorus as $(NH_4)_2HPO_4$ dissolved in water to the tantalum hydride powder preceding Step 16 of FIG. 2. Then both portions 4A and 4B were further processed and tested in accordance with Steps 16-26 and identical to the procedures described in Example 1, while portions 4B and 4D were processed and tested in accordance with Steps 16 and 22-26 and the same procedure as described in Example 2.

The test results were:

| | Powder Physical Properties | | | | | | |
|---|---|---|---|---|---|---|---|
| Example No. | Dopant Added to Ta Hydride | Powder Process | FSSS, $\mu$ | Scott Density g/in$^3$ | % -325 Mesh | Hall Flow, Sec. | Green Strength lb. |
| 4A | None | Per FIG. 2 and Example 1 | 7.8 | 50.6 | 56.5 | 35 | 24.1 |
| 4B | 25ppm P as $(NH_4)_2HPO_4$ | Per 4A with P added After Step 14 | 6.8 | 49.3 | 68.6 | 42 | 17.0 |
| 4C | None | Per FIG. 2 except Steps 18 & 20 omitted | 7.5 | 65.8 | 43.1 | 39 | 10.1 |
| 4D | 25 ppm P as $(NH_4)_2HP)_4$ | Per 4C with P added after Step 14 | 6.2 | 61.5 | 55.2 | 56 | 7.6 |

| | Powder Chemical Properties | |
|---|---|---|
| Example No. | Oxygen Content ppm | Nitrogen Content ppm |
| 4A | 1306 | — |
| 4B | 1455 | — |
| 4C | 1011 | 18 |
| 4D | 1202 | 25 |

| | Anode Sintered Properties | | | |
|---|---|---|---|---|
| | Diameter Shrinkage, % Sintered 30 min. at | | Sintered Density, g/cm$^3$ Sintered 30 min. at | |
| Example No. | 1800° C | 2000° C | 1800° C | 2000° C |
| 4A | 3.10 | 6.59 | 7.98 | 8.82 |
| 4B | 3.10 | 7.75 | 7.87 | 9.04 |
| 4C | 6.59 | 10.08 | 8.88 | 9.75 |
| 4D | 5.43 | 10.47 | 8.59 | 9.62 |

| | Anode Electrical Properties | | | | | | |
|---|---|---|---|---|---|---|---|
| | Capacitance $\mu fv/g$ Sintered 30 min. at | | Direct Current Leakage,$\mu a/\mu fv \times 10^5$ Sintered 30 min. at | | Dissipation Factor, % Sintered 30 min. at | | Breakdown Voltage, volts Sintered 30 min. at |
| Example No. | 1800° C | 2000° C | 1800° C | 2000° C | 1800° C | 2000° C | 2000° C |
| 4A | 3967 | 3234 | 15.7 | 78.0 | 18.0 | 13.6 | 228 |
| 4B | 4480 | 3317 | 16.3 | 83.4 | 19.6 | 14.2 | 226 |
| 4C | 3942 | 2980 | 14.8 | 58.1 | 22.6 | 17.6 | — |
| 4D | 4562 | 3253 | 14.6 | 50.7 | 20.4 | 17.6 | — |

This data shows similar improvements as found in Example 1 in the undoped powder characteristics of Example 4A. The reduction in green strength, increased shrinkage during sintering and lower capacitance for anodes sintered 30 minutes for powders processed in Example 4C with Steps 18 and 20 omitted is similar to that shown by a comparison of Example 2 with Example 1.

The addition of 25 ppm phosphorus to the powder of Examples 4B and 4D compared to Examples 4A and 4C respectively shows that the phosphorus addition substantially increases capacitance by about 13 to 16% for anodes sintered for 30 minutes at 1800° C., and by about 3 to 9% for anodes sintered for 30 minutes at 2000° C. These gains in capacitance were accompanied by some increase in Hall flow times and reduction in green strength, but not by amounts severe enough to offset the substantial gains in capacitance.

EXAMPLE 5

To demonstrate the effect of varying the initial Fisher sub-sieve size of the precursor tantalum hydride powder produced by Step 14 on the properties of the final powder and anodes made therefrom, a tantalum hydride precursor powder from Step 12 was divided into four portions 5A, 5B, 5C and 5D. In accordance with Step 14, the powder of portions 5A and 5C was milled and screened to a FSSS of 3.8 microns and the powder of portions 5B and 5D was milled and screened to a FSSS of 4.25 microns. Portions 5A and 5B were further processed and tested in accordance with Steps 18-26 and the procedure of Example 1, except that the temperature T-2 in Step 16 was 1325° C. instead of 1320° C., and the temperature T-1 in Step 20 was 1455° C. instead of 1450° C. Portions 5C and 5D were further processed and tested in accordance with Steps 16 and 22–26 and the procedure of Example 2, except that the temperature T-2 in Step 16 was 1325° C. instead of 1320° C.

The test results were:

Example 5B. Omission of the intermediate milling and reagglomeration STeps 18 and 20 results in increased Scott density, increased Hall flow time, reduced green strength, lower capacitance for anodes sintered 30 min-

| | | Powder Physical Properties | | | | | |
|---|---|---|---|---|---|---|---|
| Example No. | Tantalum Hydride FSSS,μ | Powder Process | FSSS, μ | Scott Density g/in$^3$ | % −325 Mesh | Hall Flow, Sec. | Green Strength, lb. |
| 5A | 3.8 | Per FIG. 2 and Example 1 (except T-1 = 1325° C and T-2 = 1455° C) | 7.4 | 55.8 | 57.3 | 39 | 24.2 |
| 5B | 4.25 | Per FIG. 2 and Example 1 (except T-1 = 1325° C and T-2 = 1455° C | 7.8 | 57.5 | 63.5 | 39 | 22.9 |
| 5C | 3.8 | Per FIG. 2 except Steps 18 and 20 omitted, and T-1 = 1325° C | 6.5 | 71.4 | 49.1 | 50 | 5.4 |
| 5D | 4.25 | Per FIG. 2 except Steps 18 and 20 omitted, and T-1 = 1325° C | 7.0 | 70.8 | 57.0 | 51 | 6.3 |

| | Powder Chemical Properties | |
|---|---|---|
| Example No. | Oxygen Content ppm | Nitrogen Content ppm |
| 5A | 1458 | 15 |
| 5B | 1298 | 19 |
| 5C | 1307 | 14 |
| 5D | 1160 | 15 |

| | Anode Sintered Properties | | | |
|---|---|---|---|---|
| | Diameter Shrinkage, % Sintered 30 min. at | | Sintered Density, g/cm$^3$ Sintered 30 min. at | |
| Example No. | 1800° C | 2000° C | 1800° C | 2000° C |
| 5A | 5.43 | 8.91 | 8.45 | 9.37 |
| 5B | 4.25 | 7.75 | 8.24 | 9.10 |
| 5C | 8.14 | 11.63 | 9.02 | 10.18 |
| 5D | 6.98 | 10.85 | 8.73 | 9.56 | utes at 2000° C., and higher dissipation factors for both initial particle sizes of 3.8 and 4.25 microns of Examples 5C and 5D.

EXAMPLE 6

The effect of using a coarser tantalum precursor powder in Step 14 than in the previous examples was shown by preparing and testing a powder and anodes in accordance with Steps 10–26 and Example 1, except that in Step 14 the hydride was milled and classified to a FSSS of 4.45 microns, in Step 16 the tantalum hydride powder was degassed and preagglomerated by holding the powder at 1320° C. for one hour (instead of one-half hour) because of its larger particle size, and in Step 20 the powder was reagglomerated at a temperature of 1460° C. (instead of 1450° C.) because of its larger particle size.

The test results were:

| | | | Powder Physical Properties | | | | |
|---|---|---|---|---|---|---|---|
| Example No. | Tantalum Hydride FSSS,μ | Powder Process | FSSS, μ | Scott Density g/in$^3$ | % −325 Mesh | Hall Flow, Sec. | Green Strength, lb. |
| 6 | 4.45 | Per FIG. 2, except that in Step 16 degassing and agglomeration was for 60 min. at 1320° C and in Step 20 reagglomeration was for 60 min. at 1460° C | 8.9 | 62.4 | 59.5 | 34 | 19.0 |

| | Anode Electrical Properties | | | | | | |
|---|---|---|---|---|---|---|---|
| | Capacitance μfv/g Sintered 30 min. at | | Direct Current Leakage,μa/μfv × 10$^5$ Sintered 30 min. at | | Dissipation Factor, % Sintered 30 min. at | | Breakdown Voltage, volts Sintered 30 min. at |
| Example No. | 1800° C | 2000° C | 1800° C | 2000° C | 1800° C | 2000° C | 2000° C |
| 5A | 4050 | 3104 | 18.9 | 60.7 | 22.0 | 13.2 | 256 |
| 5B | 3919 | 3107 | 23.3 | 60.1 | 20.0 | 12.0 | 263 |
| 5C | 4142 | 2939 | 15.3 | 64.4 | 26.8 | 16.6 | 277 |
| 5D | 4065 | 3084 | 14.1 | 59.5 | 23.4 | 15.2 | 266 |

These data show that either FSSS 3.8 or 4.25 micron tantalum hydride precursor powders can be used in the process of this invention. The finer (3.8 micron) precursor powder of Example 5A results in slightly higher oxygen, higher shrinkage during sintering, and higher capacitance for anodes sintered 30 minutes at 1800° C. than does the coarser 4.25 micron precursor powder of

| | Powder Chemical Properties | |
|---|---|---|
| Example No. | Oxygen Content ppm | Nitrogen Content ppm |
| 6 | 1592 | 13 |

| Anode Sintered Properties | |
|---|---|
| Diameter Shrinkage, % | Sintered Density, g/cm$^3$ |

| Example No. | Sintered 30 min. at 1800° C | Sintered 30 min. at 2000° C | Sintered 30 min. at 1800° C | Sintered 30 min. at 2000° C |
|---|---|---|---|---|
| 6 | 3.68 | 7.36 | 8.05 | 8.84 |

| | Anode Electrical Properties | | | | | | |
|---|---|---|---|---|---|---|---|
| | Capacitance μfv/g Sintered 30 min. at | | Direct Current Leakage,μa/μfv × $10^5$ Sintered 30 min. at | | Dissipation Factor, % Sintered 30 min. at | | Breakdown Voltage, volts Sintered 30 min. at |
| Example No. | 1800° C | 2000° C | 1800° C | 2000° C | 1800° C | 2000° C | 2000° C |
| 6 | 3882 | 3085 | 15.6 | 98.4 | 15.8 | 11.8 | 237 |

These data show that a 4.45 micron tantalum hydride precursor powder can be used to produce an improved powder and anodes made therefrom.

EXAMPLE 7

The properties of the powders and anodes of this invention as exemplified in Example 1 may be compared with the properties of typical powders and anodes produced by the prior art processes of the aforementioned Bates et al. U.S. Pat. No. 4,017,302 and Pierret U.S. Pat. No. 3,473,915 which are referred to in the following data as Examples 1, 7A and 7B respectively.

| | Powder Physical Properties | | | | | | |
|---|---|---|---|---|---|---|---|
| Example No. | Tantalum Hydride FSSS, μ | Powder Process | FSSS, μ | Scott Density g/in³ | % −325 Mesh | Hall Flow, Sec. | Green Strength, lb. |
| 1 | 4.15 | Per FIG. 2 and Example 1 | 9.0 | 62.1 | 54.6 | 32 | 19.5 |
| 7A | 4.15 | Per FIG. 1 and U.S. Pat. No. 4,017,302 | 9.9 | 61.3 | 49.3 | 33 | 14.5 |
| 7B | 4.20 | Per U.S. Pat. No. 3,473,915 with agglomeration for 60 min. at 1410° C and without any binders | 6.8 | 69.4 | 64.1 | 33 | 6.9 |

| | Powder Chemical Properties | |
|---|---|---|
| Example No. | Oxygen Content ppm | Nitrogen Content ppm |
| 1 | 1479 | 19 |
| 7A | 1825 | 22 |
| 7B | 1680 | 26 |

| | Anode Sintered Properties | | | |
|---|---|---|---|---|
| | Diameter Shrinkage, % Sintered 30 min. at | | Sintered Density, g/cm³ Sintered 30 min. at | |
| Example No. | 1800° C | 2000° C | 1800° C | 2000° C |
| 1 | 3.9 | 7.8 | 8.07 | 9.01 |
| 7A | 5.0 | 9.3 | 8.30 | 9.46 |
| 7B | 8.1 | 11.2 | 9.10 | 10.00 |

| | Anode Electrical Properties | | | | | | |
|---|---|---|---|---|---|---|---|
| | Capacitance μfv/g Sintered 30 min. at | | Direct Current Leakage,μa/μfv × $10^5$ Sintered 30 min. at | | Dissipation Factor, % Sintered 30 min. at | | Breakdown Voltage, volts Sintered 30 min. at |
| Example No. | 1800° C | 2000° C | 1800° C | 2000° C | 1800° C | 2000° C | 2000° C |
| 1 | 3917 | 3061 | 24.3 | 56.6 | 18.2 | 14.4 | 239 |
| 7A | 3879 | 3015 | 15.2 | 72.0 | 18.0 | 12.2 | 246 |
| 7B | 3966 | 2994 | 19.1 | 45.7 | 19.8 | 16.2 | 248 |

These data show that powders of this invention have a significantly higher green strength when compacted and a significantly lower oxygen content which minimizes embrittlement of anode lead wires during sintering, and that anodes of such powders have less shrinkage in sintering, a lower density when sintered, and, in some instances, a higher capacitance than prior art tantalum powders and anodes thereof. Furthermore, the powders of this invention have good flow characteristics, require no binders, can be recycled in compacting operations, and produce anodes having little direct current leakage, a low dissipation factor, high capacitance, high working and breakdown voltages, improved reliability and a longer service life. Moreover, the process of this invention for producing such powders and anodes thereof is simpler and less expensive to utilize and is believed to be more reliable than previously known processes.

I claim:

1. A method of manufacturing an improved, high-purity agglomerated tantalum powder having relatively low oxygen content, good flow characteristics and high green strength in the absence of a binder, relatively low shrinkage during sintering, and high specific capacitance in pressed anodes after sintering, which consists essentially of:

(a) reducing and classifying hydrided high-purity tantalum ingots to a precursor powder having a predetermined particle size and particle size distribution,
(b) subjecting the reduced and classified tantalum hydride powder to a heat treatment at a predetermined temperature under chemical nonreactive conditions to degas it at a lower first temperature, and then to preagglomerate the powder at a higher temperature T-1,
(c) reducing the preagglomerated powder to a mesh size of less than 80 mesh,
(d) heating the less than 80 mesh powder under nonreactive conditions to a temperature T-2, which is higher than T-1, to reagglomerate it,
(e) reducing the reagglomerated powder to an intermediate mesh size larger than the mesh size of the preagglomerated powder, and
(f) blending the reduced intermediate mesh size powder to provide a tantalum powder for pressing into shapes for sintering to form low density anodes.

2. A method as defined in claim 1 in which the high-purity tantalum ingots are consolidated by methods selected from electron-beam melting and consumable-electrode, arc melting.

3. A method as defined in claim 1 in which the average Fisher sub-sieve size of the tantalum hydride precursor powder is in the range of 3.8 to 4.5 microns.

4. A method as defined in claim 1 in which the average Fisher sub-sieve size of the tantalum hydride precursor powder is in the range of 4.1 to 4.5 microns.

5. A method as defined in claim 1 in which the Roller particle distribution of the tantalum hydride precursor powder does not contain more than 10% by weight of particles with a Fisher sub-sieve size of less than 3 microns.

6. A method as defined in claim 1 in which at least 80% by weight of the tantalum hydride precursor powder has a Roller particle size distribution ranging from a minimum size of 3 microns to a maximum size of 20 microns.

7. A method as defined in claim 1 in which the preagglomeration temperature T-1 is in the range of 1100° to 1400° C.

8. A method as defined in claim 1 in which the preagglomeration temperature T-1 is about 1320° C.

9. A method as defined in claim 1 in which the preagglomerated powder is milled and screened to pass through an 80 mesh screen.

10. A method as defined in claim 1 in which the preagglomerated powder is milled and screened to pass through a 200 mesh screen.

11. A method as defined in claim 1 in which the said preagglomerated powder is milled and screened to pass through a 325 mesh screen.

12. A method as defined in claim 1 in which the reagglomeration temperature T-2 is in the range of 1375° to 1525° C.

13. A method as defined in claim 1 in which the reagglomeration temperature T-2 is about 1450° C.

14. A method as defined in claim 1 in which the reagglomerated powder is milled and screened to a screen size larger than that of the preagglomerated powder.

15. A method as defined in claim 1 in which the reagglomerated powder is milled and screened to pass through a 35 mesh screen.

16. A tantalum powder produced by the method of claim 5 and having an oxygen content of less than 1600 ppm, and an average green strength of at least 15 pounds on cylindrical parts compacted without any binder to a green density of 7.0 grams per cubic centimeter, weighing 2 grams, having a diameter of 0.261 of an inch, and crushed by applying force on the parts laid sideways.

17. A tantalum powder of claim 16 having an oxygen content of less than 1518 ppm.

18. A tantalum powder of claim 17 and having a Hall flow of less than 60 seconds with the Hall cup vibrated at a frequency of 3600 cycles per minute and an amplitude of 0.024 of an inch.

19. A tantalum powder produced by the method of claim 1 and having an average green strength of at least 19.5 pounds on cylindrical parts compacted without any binder to a green density of 7.0 grams per cubic centimeter, weighing 2 grams, having a diameter of 0.261 of an inch, and crushed by applying force on the parts laid sideways.

20. A tantalum powder of claim 19 and having an average green strength of at least 22 pounds.

21. A tantalum powder of claim 17 and having a specific capacitance expressed in microfarad-volts per gram (CV/g) of at least 3850 on anodes sintered for 30 minutes at 1800° C., and at least 3000 on anodes sintered for 30 minutes at 2000° C., when the anodes are pressed from the powder to a green density of 7.2 grams per cubic centimeter, after sintering anodized in a solution of 0.01% phosphoric acid at 200 volts for those anodes sintered at 1800° C. and at 270 volts for those anodes sintered at 2000° C., and tested for specific capacitance in a solution of 10% phosphoric acid.

22. An anode for an electrolytic device consisting essentially of a pressed and sintered compact of a tantalum powder of claim 21 in which the powder was compacted without any binders.

23. A tantalum powder of claim 17 and having a dissipation factor of about:
(a) 15 to 22% for anodes pressed to a green density of 7.2 g/cm$^3$ and sintered for 30 minutes at 1800° C., and
(b) 10 to 15% for anodes pressed to a green density of 7.2 g/cm$^3$ and sintered for 30 minutes at 2000° C.

24. A tantalum powder produced by the method of claim 1 and having a diametrical shrinkage not greater than:
(a) 3.9% for anodes pressed without any binder to a green density of 7.2 g/cm$^3$ and sintered for 30 minutes at 1800° C., and
(b) 7.8% for anodes pressed without any binder to a green density of 7.2 g/cm$^3$ and sintered for 30 minutes at 2000° C.

25. An agglomerated powder selected from the hydride forming metals of Group IVB of the Periodic Table of the Elements comprising titanium, zirconium, and hafnium, and Group VB comprising tantalum, columbium and vanadium, the agglomerated powder produced by the method consisting essentially of:
(a) subjecting the metal to a hydrogen atmosphere to produce a friable mass,
(b) reducing the hydride mass to produce a hydride powder having an average Fisher sub-sieve particle size of less than 10 microns,
(c) heating the hydride powder in a chemically non-reactive environment to remove the hydrogen,
(d) further heating the degassed powder in a chemically non-reactive environment to a sufficient temperature T-1 and for a sufficient time to produce a porous sintered cake in which at least the finer powder particles are bonded, (e) reducing the porous sintered cake into aggregates of a size of less than 80 mesh and each comprised of multiple initial particles and having an average particle size substantially larger than the average size of the initial particles of the hydride power produced by step (b), (f) heating the aggregates of less than 80 mesh in a chemically non-reactive environment to a sufficient temperature T-2 which is higher than T-1 and for a sufficient time to produce a reagglomerated porous cake, (g) reducing the reagglomerated porous cake produced by step (f) into aggregates of multiple initial particles with such aggregates having an average particle size substantially larger than the average size of the initial particles of the hydride powder produced by step (b) and of the aggregates produced by step (e), and (h) blending the aggregates produced by step (g) to produce the final powder, said final powder having an average green strength of at least 19.5 pounds on cylindrical parts compacted without any binder to a green density of 7.0 grams per cubic centimeter, weighing 2 grams, having a diameter of 0.261 of an inch, and crushed by applying force on the parts laid sideways.

26. An anode for an electrolytic device consisting essentially of a pressed and sintered compact of the tantalum powder of claim 25 in which the powder was compacted without any binders.

27. A process for producing an agglomerated powder selected from the hydride forming metals consisting essentially of Group IVB and Group VB of the Periodic Table of the Elements namely titanium, zirconium and hafnium, and tantalum, columbium and vanadium, the process consisting essentially of:

(a) subjecting the metal to a hydrogen atmosphere to produce a friable mass, (b) reducing the hydride mass to a hydride powder having an average Fisher sub-sieve particle size of less than 10 microns, (c) heating the hydride powder in a chemically non-reactive environment to remove the hydrogen, (d) further heating the degassed powder in a chemically non-reactive environment to a sufficient temperature T-1 and for a sufficient time to produce a porous sintered cake in which at least the finer powder particles are bonded, (e) reducing the porous sintered cake into aggregates of a size of less than 80 mesh and each of multiple initial particles with such aggregates having an average particle size substantially larger than the average size of the initial particles of hydride powder produced by step (b), (f) heating the aggregates of less than 80 mesh in a chemically non-reactive environment to a sufficient temperature T-2 which is higher than T-1 and for a sufficient time to produce a reagglomerated porous cake, (g) reducing the reagglomerated porous cake produced by step (f) into aggregates of multiple initial particles with such aggregates having an average particle size substantially larger than the average size of the initial particles of hydride powder produced by step (b) and of the aggregates produced by step (e), and (h) blending the aggregates produced by step (g) to produce the final powder.

28. An anode for an electrolytic device consisting essentially of a pressed and sintered compact of a tantalum powder produced by the process of claim 27 in which the powder was compacted without any binders.

29. A high-purity agglomerated tantalum powder for making compacted and sintered anodes having:

(a) an oxygen content of not more than 1518 ppm, (b) a Scott density in the range of about 50 to 65 g/in$^3$, (c) an average Fisher sub-sieve size of 7 to 10 microns, (d) essentially all of its particles passable through a 35 mesh screen, (e) not more than about 65% by weight of its particles passable through a 325 mesh screen, (f) a Hall flow time of less than 60 seconds with the Hall flow cup vibrated at a frequency of 3600 cycles per minute and an amplitude of 0.024 inch, (g) an average green strength of at least 19.5 pounds on 2-gram, 0.261 inch diameter cylinders compacted without any binder to a green density of 7.0 grams per cubic centimeter and crushed by applying force on the cylinders laid sideways, (h) a linear shrinkage not greater than 3.9% for anodes pressed without any binder to a green density of 7.2 g/cm$^3$ and sintered for 30 minutes at 1800° C. and not greater than 7.8% for anodes pressed without any binder to a green density of 7.2 g/cm$^3$ and sintered for 30 minutes at 2000° C., (i) a dissipation factor of about 15 to 22% for anodes pressed without any binder to a green density of 7.2 g/cm$^3$ and sintered for 30 minutes at 1800° C. and of about 10 to 15% for anodes pressed to a green density of 7.2 g/cm$^3$ and sintered for 30 minutes at 2000° C., and (j) a specific capacitance expressed as microfarad-volts per gram (CV/g) of at least 3850 on anodes pressed without any binder to a green density of 7.2 g/cm$^3$, sintered for 30 minutes at 1800° C., anodized in a solution of 0.01% phosphoric acid at 200 volts and tested in a solution of 10% phosphoric acid and of at least 3000 on anodes pressed without any binder to a green density of 7.2 g/cm$^3$, sintered for 30 minutes at 2000° C., anodized in a solution of 0.01% phosphoric acid at 270 volts, and tested for specific capacitance in a solution of 10% phosphoric acid.

30. The tantalum powder of claim 29 which also comprises a phorphorus material in an amount equivalent to about 5 to 400 parts per million of elemental phosphorus.

31. An anode for an electrolytic device consisting essentially of a pressed and sintered compact of the tantalum powder of claim 29 in which the powder was compacted without any binders.

* * * * *